Dec. 16, 1924.

J. TRUST ET AL 1,519,979

TRUCK

Filed Sept. 18, 1919

INVENTORS
Josephine Trust.
Henry Trust.
BY
ATTORNEY

Patented Dec. 16, 1924.

1,519,979

UNITED STATES PATENT OFFICE.

JOSEPHINE TRUST AND HENRY TRUST, OF PARK RIDGE, NEW JERSEY, ASSIGNORS, BY MESNE ASSIGNMENTS, TO FITCHBURG MACHINE WORKS, OF FITCHBURG, MASSACHUSETTS, A CORPORATION OF MASSACHUSETTS.

TRUCK.

Application filed September 18, 1919. Serial No. 324,612.

*To all whom it may concern:*

Be it known that we, JOSEPHINE TRUST and HENRY TRUST, citizens of the United States, residing at Park Ridge, in the county of Bergen and State of New Jersey, have invented certain new and useful Improvements in Trucks, of which the following is a specification, reference being had therein to the accompanying drawing.

Our invention relates to improvements in dough mixing vehicles and more particularly has reference to a vehicle provided with an elevating platform adapted for carrying a chamber in position beneath the mixing machine.

Figure 1:
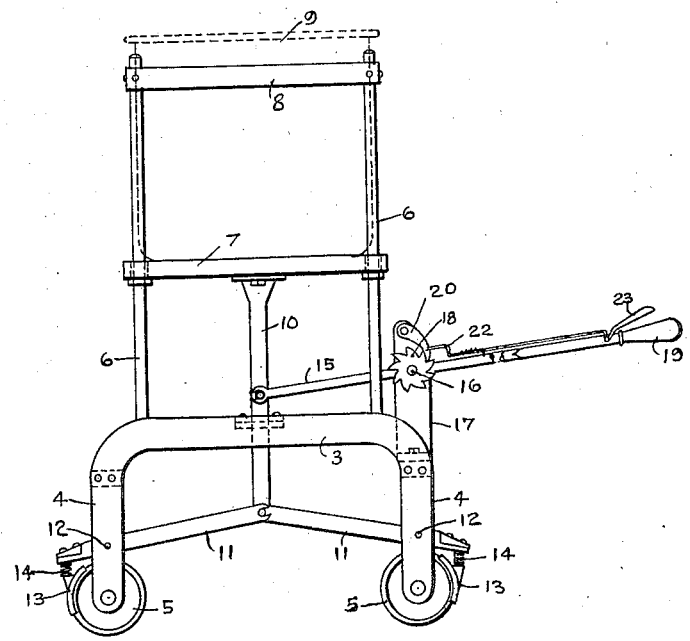
Figure 2:
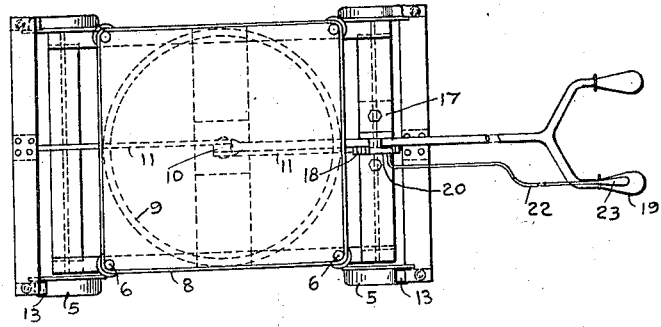

In the accompanying drawings, we have illustrated in Fig. 1 in side elevation a suitable form of car embodying an application of our invention. Fig. 2 is a plan view looking down upon Fig. 1.

3 indicates the frame of the car provided with legs 4 in the ends of which are mounted the wheels 5 as shown, and 6 indicates the standards upon which is vertically slidably mounted platform 7, such standards being secured at the top by a frame 8 within which the tub 9 may rest upon the platform 7 as shown in dotted outline in Fig. 1. 10 indicates a suitable plunger for raising the platform, being pivotally connected at the bottom to the levers 11 which in turn are pivoted at 12 upon the legs 4, the outer ends of said levers being provided with suitable brakes 13 projected by springs 14, and 15 indicates another lever having a forked end engaging the plunger 10 as shown and pivotally mounted at 16 upon the bracket 17 and carrying the ratchet 18, the outer end being provided with a handle 19 for raising the platform 7. 20 indicates a pawl pivotally mounted upon the bracket 17 and connected to the rod 22 pivotally connected to the hand piece 23 for dis-engaging said pawl from the ratchet 18 so that platform 7 and its tub 9 can be raised when the vehicle is in position for operation and can be lowered for removal at will while at the same time, the levers 11 being drawn upwardly, apply the brakes 13 to prevent the movement of the car.

Of course, it will be understood that various modifications may be made in the construction and arrangement of parts without departing from the spirit of the invention as claimed.

We claim:

1. In a vehicle having a platform, means for raising and retaining the platform thereof at any desired height, and in combination therewith means for automatically braking said vehicle when operating said platform.

2. A truck having a frame, formed of two approximately U-shaped members mounted in rigid spaced relation, uprights supported by said members, a rigid platform movable between said uprights and guided thereby, a projection from said frame and a ratchet controlled lever pivoted in said projection and adapted to raise and lower said platform.

3. A truck having a frame, supporting wheels for said frame, brakes on said wheels, a platform mounted for vertical movement on said frame, actuating means to raise and lower said platform, and permanent connections from said platform to said brakes effective to apply the brakes when the platform is raised by said actuating means.

4. A truck having a frame made of parallel approximately U-shaped members, uprights supported by said frame, a movable platform between said uprights and guided thereby, a depending member secured to said platform, a ratchet controlled lever engaging said depending member for operating said platform and a plurality of brake operating levers, pivoted to said depending member and adapted to set and release the brakes of said truck.

5. A truck having a frame made of parallel approximately U-shaped members, uprights supported by said frame, a movable platform between said uprights and guided thereby, a depending member secured to said platform, a ratchet controlled lever engaging said depending member for operating said platform, a plurality of brake operating levers, pivoted to said depending member, and adapted to set and release the brakes of said truck, and springs between said brakes and said brake operating levers.

In testimony whereof we hereunto affix our signatures in the presence of two witnesses.

JOSEPHINE TRUST.
HENRY TRUST.

Witnesses:
MADELINE C. FOERST,
DAVID H. DOUGLASS.